United States Patent
Rätzsch et al.

(10) Patent No.: US 7,173,104 B2
(45) Date of Patent: Feb. 6, 2007

(54) PRODUCTS, ESPECIALLY MOULDING MATERIALS OF POLYMERS CONTAINING TRIAZINE SEGMENTS, METHOD FOR THE PRODUCTION THEREOF AND USES OF THE SAME

(75) Inventors: Manfred Rätzsch, Wilhering/Thalheim (AT); Hartmut Bucka, Eggendorf (AT); René Dicke, Linz (AT); Martin Burger, Linz (AT); Steffen Pfeiffer, Linz (AT); Christian Fürst, Linz (AT)

(73) Assignee: AMI - Agrolinz Melamine International GmbH, Linz (AT)

( * ) Notice: Subject to any disclaimer, the term of this patent is extended or adjusted under 35 U.S.C. 154(b) by 0 days.

(21) Appl. No.: 10/495,903

(22) PCT Filed: Nov. 19, 2002

(86) PCT No.: PCT/DE02/04305

§ 371 (c)(1),
(2), (4) Date: Sep. 29, 2004

(87) PCT Pub. No.: WO03/046053

PCT Pub. Date: Jun. 5, 2003

(65) Prior Publication Data

US 2005/0038226 A1  Feb. 17, 2005

(30) Foreign Application Priority Data

Nov. 19, 2001 (AT) ............... A 1812/2001
Nov. 19, 2001 (AT) ............... A 1813/2001

(51) Int. Cl.
*C08G 73/00* (2006.01)
*C08G 73/06* (2006.01)

(52) U.S. Cl. ............ 528/423; 528/422; 528/487; 528/492; 528/495; 525/540

(58) Field of Classification Search ......... 528/423, 528/254, 362, 422, 487, 492, 495; 264/14; 525/540
See application file for complete search history.

(56) References Cited

U.S. PATENT DOCUMENTS

| | | |
|---|---|---|
| 2,807,595 A | 9/1957 | Brown |
| 3,912,532 A | 10/1975 | Simone |
| 3,957,718 A | 5/1976 | Pochert et al. |
| 4,180,488 A | 12/1979 | Stern et al. |
| 4,334,971 A | 6/1982 | Mahnke et al. |
| 4,349,660 A | 9/1982 | Toivonnen |
| 4,472,538 A | 9/1984 | Kamigaito et al. |
| 4,558,075 A | 12/1985 | Suss et al. |
| 5,102,923 A | 4/1992 | Porosoff et al. |
| 5,162,487 A | 11/1992 | Weiser et al. |
| 5,866,645 A | 2/1999 | Pinnavaia et al. |
| 5,866,654 A | 2/1999 | Fuss et al. |
| 5,942,598 A | 8/1999 | Iwa et al. |
| 5,955,535 A | 9/1999 | Vaia et al. |
| 6,096,803 A | 8/2000 | Pinnavaia et al. |
| 2004/0054034 A1 | 3/2004 | Ratzsch et al. |
| 2004/0082697 A1 | 4/2004 | Rätzsch et al. |

FOREIGN PATENT DOCUMENTS

| | | |
|---|---|---|
| CA | 2000472 | 4/1990 |
| DE | 1054232 | 4/1959 |
| DE | 1250584 A | 9/1967 |
| DE | 196 44 930 A1 | 3/1998 |
| EP | 0 017 671 A1 | 10/1980 |
| EP | 0 037 470 B1 | 10/1981 |
| EP | 0 093 965 A2 | 11/1983 |
| EP | 0 149 652 B1 | 7/1985 |
| EP | 0 408 947 B1 | 1/1991 |
| EP | 0 484 245 A1 | 5/1992 |
| EP | 0 822 163 A2 | 2/1998 |
| EP | 1 038 834 A1 | 9/2000 |
| EP | 1 038 913 A1 | 9/2000 |
| JP | 52033931 | 3/1977 |
| JP | 57-200454 A2 | 12/1982 |

(Continued)

OTHER PUBLICATIONS

Porosoff et al, Flame retardant rigid polyurethane and polyisocyanurate foams, 1992, American Cyanamid., Chem Abstract 117: 113084.*

(Continued)

*Primary Examiner*—Duc Truong
(74) *Attorney, Agent, or Firm*—Christie, Parker & Hale, LLP

(57) ABSTRACT

The invention relates to products, especially moulding materials of polymers containing triazine segments and consisting of mixtures of meltable 4–18 ring oligotriazine ethers which are soluble in highly polar solvents, and in which the triazine rings are predominantly linked by alkylene diamino groups. Said moulding materials can contain up to 50 mass % of other reactive polymers such as ethylene copolymers, maleic acid anhydride copolymers, modified maleic acid anhydride copolymers, poly(meth)acrylates, polyamides, polyester and/or polyurethanes, up to 75 mass % of filling materials and/or reinforcing fibres, and up to 2 mass % of stabilisers, UV absorbers and/or auxiliary agents. The moulding materials of polymers containing triazine segments can be processed by means of conventional fusion methods and can be used as hot-melt adhesives and for producing plates, tubes, profiles, injection moulded parts, fibres, coatings and foamed material.

20 Claims, No Drawings

FOREIGN PATENT DOCUMENTS

| | | |
|---|---|---|
| JP | 58-217424 | 12/1983 |
| JP | 04-305005 | 10/1992 |
| JP | 04-335045 | 11/1992 |
| JP | 1001808 A2 | 3/1998 |
| JP | 11-323106 | 11/1999 |
| JP | 2000-191925 | 7/2000 |
| RU | 2 154 073 C1 | 8/2000 |
| WO | WO 93/04117 A1 | 3/1993 |
| WO | WO95/14733 | 6/1995 |
| WO | WO 96/20230 | 7/1996 |
| WO | WO96/20230 | 7/1996 |
| WO | WO 96/20239 | 7/1996 |
| WO | WO 00/09571 | 2/2000 |
| WO | WO 00/09605 | 2/2000 |
| WO | WO 00/24818 | 5/2000 |
| WO | WO 00/44669 | 8/2000 |
| WO | WO00/49072 | 8/2000 |
| WO | WO 01/04205 A1 | 1/2001 |
| WO | WO 02/48248 A2 | 6/2002 |
| WO | WO 02/48270 A1 | 6/2002 |

OTHER PUBLICATIONS

Toivonnen et al, Air drying modified amino resin, 1982, Kemira Oy, Chem Abstract 97: 184121.*
Stern et al, Storage—resins, 1982, Chemie Linz, Chem Abstract 91: 194742.*
Stern et al, Storage—coating resins, 1979, Lentia G.m.b.H. Chem. und Pharm., Chem Abstract 90: 170241.*
Hongu et al, Fireproofing of polyurethane foams, 1976, Nisshin Spinning Co., Ltd., JP, Chem Abstract 85: 144070.*
Akutin et al, Synthesis—triazine, 1976, USSR,Chem Abstract 85: 143066.*
Uragami et al, Formaldehyde condensation resin, 1970, Kansai Univ., Osaka, JP, Chem Abstract 72: 22226.*
International Search Report of PCT/DE02/04305, dated May 15, 2003.
International Preliminary Examination Report of PCT/DE02/04305, dated Mar. 9, 2004.
Ullmanns Encyclopedia of Industrial Chemistry (1987), vol. A2, 130-131 (On Order).
Woebcken, "Kunststoff-Handbuch Bd. 10 'Duroplaste' —Plastics Manual vol. 10 Thermosets" Munich 1988, pp. 266-274 (On Order).
Bjuller, Teplo-i Termostoikie Polimery, Khimiya, Moskva 1984, pp. 565-581 (On Order).
International Search Report of PCT/EP01/14583, dated Jun. 7, 2002.
International Preliminary Examination Report of PCT/EP01/14583, dated Sep. 4, 2002, and corresponding English translation.
International Search Report of PCT/EPO01/14581, dated Apr. 18, 2002.
DATABASE WPI, Section Ch, Week 199250, Derwent Publications Ltd., London, GB; AN 1992-409808, XP002199333.
DATABASE WPI, Section Ch, Week 197717, Derwent Publications Ltd., London, GB; AN 1977-29855Y, XP002199334.
Mulhaupt et al, "PP-Compounds as Engineering Materials", Kunststoffe 87 (1997), pp. 482-486.
Lagaly, G., "Characterization of Clays By Organic Compounds", Clay minerals (1981) vol. 16, pp. 1-21.
Gilman, J.W., et al., "Flammability Studies of Polymer Layered Silicate Nanocomposites: Polyolefin, Epoxy, and Vinyl Ester Resins" Chemistry and Technology of Polymer Additives, Chapter 14, National Institute of Standards and Technology, 1999, pp. 249-265.
English Translation of International Preliminary Examination Report of PCT/EP01/14581, dated May 2, 2003.
Mertschenk et al., Thiourea and Thiourea Derivatives, 2005, Wiley-VCH Verlag GmbH & Co. KGaA, Weinheim, 14 pp.
Ammelide, Ammeline and Related Compounds, pp. 269-306.
English translation of International Preliminary Examination Report of PCT/DE2002/004305, dated Mar. 9, 2004.
Ullmanns Encyclopedia of Industrial Chemistry (1987), vol. A2, 130-131.
Woebcken, "Kunststoff-Handbuch Bd. 10 'Duroplaste'—Plastics Manual vol. 10 Thermosets" Munich 1988, pp. 266-274 (w/English translation of relevant parts).
Bjuller, Teplo-i Termostoikie Polimery, Khimiya, Moskva 1984, pp. 565-581 (W/English translation of relevant parts).

* cited by examiner

PRODUCTS, ESPECIALLY MOULDING MATERIALS OF POLYMERS CONTAINING TRIAZINE SEGMENTS, METHOD FOR THE PRODUCTION THEREOF AND USES OF THE SAME

CROSS-REFERENCE TO RELATED APPLICATION

This application is a National Phase Patent Application of International Application Number PCT/DE02/04305, filed on Nov. 19, 2002, which claims priority of Austrian Patent Application Number A 1812/2001, filed on Nov. 19, 2001, and Austrian Patent Application Number A 1813/2001, filed on Nov. 19, 2001.

FIELD OF THE INVENTION

The invention relates to products, in particular molding materials of polymers containing triazine segments as well as a method for their production and uses of the products.

The term "product" in this application means both a final product (e.g., an injection-molded part) and a molding material that serves as an intermediate product.

Molding materials are unmolded products that can be permanently molded into molded parts or semifinished products under the action of mechanical forces by shaping within a specific temperature range. When products are described in this application, this means both final products and molding materials. If reference is made explicitly to molding materials, this is mentioned directly.

Thus, this invention includes in particular methods for production of final products as well as methods for production of molding materials.

BACKGROUND

Products of polymers containing triazine segments such as melamine formaldehyde resins or melamine urea form-aldehyde resins in the form of coatings, laminated sheets, laminates, molding materials in the household sector and the electronics industry, fibers or foams [Ullmanns Encyclopedia of Industrial Chemistry (1987), Vol. A2, 130–131] are known. Disadvantageous in the production of semifinished products or molding materials made of melamine resins is the difficulty of processing using conventional thermoplastic processing methods such as extrusion, injection molding or blow molding, since high molecular melamine resins are crosslinked and unmeltable. Uncrosslinked low molecular melamine resin precondensates have too low a melt viscosity for these processing methods and can be processed only with highly filled molding materials with long process times followed by curing of the products (Woebcken, W., Kunststoff-Handbuch [Plastics Manual] Vol. 10 "Duroplaste [Thermosets]", Carl Hanser Verlag Munich 1988, pp. 266–274). Fibers (EP 0093 965A1), foams (EP 0017671A1) or coatings (WO 96/20239 A1) made from melamine resins can be produced starting only from solutions of the melamine resin precondensate because of the low melt viscosity of the melamine resin precondensate with hardening during molding. Furthermore, during polycondensation of the aminoplastic precondensates, the volatile byproducts cause micropores or cracks in the surface of the products. Thus, materials result that have reduced resistance to environmental influences.

Also known are high molecular linear polytriazine with aromatic bridging bonds (Bjuller, K., Teplo-i Termostoikie Polimery, Khimiya, Moskva 1984, pp. 565–581). These linear polytriazines have glass transition temperatures above 200° C. and cannot be melted without decomposing.

DETAILED DESCRIPTION

The object is to provide products, in particular molding materials of the type mentioned that can be processed using conventional thermoplastic processing methods of fusion processing such as extrusion, injection molding or blow molding.

The object according to the invention is accomplished through products, in particular molding materials of polymers containing triazine segments, in which the polymers containing triazine segments contain mixtures according to the invention of meltable 4- to 18-ring oligotriazine ethers based on aminotriazine ethers of the structure

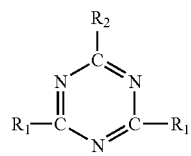

where:

$R_1=R_4$—O—$CHR_3$—NH—; or [$R_4$—O—$CHR_3$]$_2$N—

$R_2$=—$NH_2$, —NH—$CHR_3$—$OR_4$, —N[$CHR_3$—O—$R_4$]$_2$, —$CH_3$, —$C_3H_7$, —$C_6H_5$, —OH, phthalimido-, or succinimido-, $R_3$=H or $C_1$-$C_7$-alkyl; and $R_4$=$C_1$-$C_{18}$-alkyl; or H.

In a preferred embodiment, the triazine segments in the oligotriazine ethers are

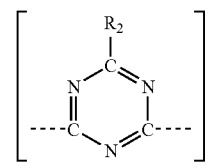

where:

$R_2$=—$NH_2$, —NH—$CHR_3$—$OR_4$, —N[$CHR_3$—O—$R_4$]$_2$, or —$CH_3$, —$C_3H_7$, —$C_6H_5$, $R_3$=H or $C_1C_7$-alkyl; and $R_4$=$C_1$-$C_{18}$-alkyl; or H, linked by bridging bonds to 4- to 18-ring oligotriazine ethers with linear and/or branched structure.

In another preferred embodiment, with linear linking of the triazine rings, the bridging bonds form the type I to III

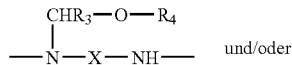

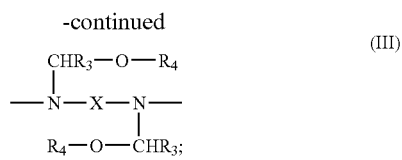

where X=CHR$_3$ and alternatively CHR$_3$—O—CHR$_3$,

Advantageously, the bridging bonds with branched structure (z>v+2; z=number of bonded triazine rings; v=number of branching points) are both bridging bonds of type I to III in the linear chain segments and bridging bonds of the type IV to VII in the highly branched chain segments (z=v+2):

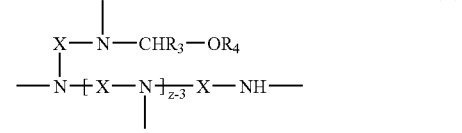

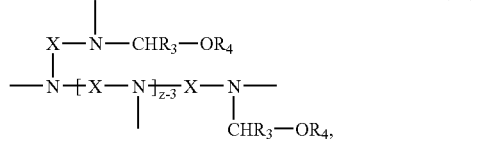

where X=CHR$_3$ and alternatively CHR$_3$—O—CHR$_3$,

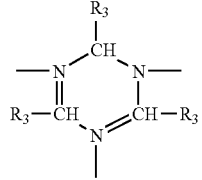

where:

R$_3$=H or C$_1$–C$_7$-alkyl; and

R$_4$=C$_1$–C$_{18}$-alkyl; or H,

In another advantageous embodiment, the substituent R$_4$ in the aminotriazine ethers or oligotriazine ethers is exclusively C$_1$–C$_{18}$-alkyl or predominantly C$_1$–C$_{18}$-alkyl.

It is also advantageous if, in the oligotriazine ethers, the molar ratio of ether groups/triazine segments is 1:2 to 4.5:1.

In another advantageous embodiment comprise oligotriazine ethers, which, in the bridging bonds, X=CHR$_3$—O—CHR$_3$, contain up to 35 wt % in the molding materials of polymers containing triazine segments.

Advantageously, the products, in particular the molding materials of polymers containing triazine segments alternatively contain up to 75 wt % fillers and/or reinforcing fibers, up to 50 wt % of other reactive polymers of the type ethylene copolymers, maleic acid anhydride copolymers, modified maleic acid anhydride copolymers, poly(meth)acrylates, polyamides, polyestersand/or polyurethanes, as well as up to 2 wt % stabilizers, UV absorbers and/or auxiliary agents.

In an advantageous embodiment, the oligotriazine ethers are soluble in polar solvents of the type C$_1$–C$_{10}$-alcohols, dimethyl formamide or dimethyl sulfoxide.

Advantageously, the products are produced by thermoplastic processing of molding materials of mixtures of meltable 4- to 18-ring oligotriazine ethers based on the structure according to claim 1.

It is also advantageous if the molding materials are available in the form of cylindrical, lenticular, pellet-shaped or spherical particles with an average diameter of 0.5 to 8 mm.

Preferably, the products of polymers containing triazine segments are semifinished products, in particular sheets, tubes, profiles, coatings, foamed materials or fibers, or molding materials, in particular injection-molded parts, components produced using the resin infusion or resin injection method or components produced from fibers using filament winding, braiding or pultrusion technology and subsequent resin impregnation.

Preferred are products of polymers containing triazine segments, in which the molding materials used consist of mixtures of oligotriazine ethers, where R$_2$=—NH$_2$, —NH—CHR$_3$—OR$_4$, or —N[CHR$_3$—O—R$_4$]$_2$;

R$_3$=H; and

R$_4$=C$_1$–C$_{18}$-alkyl or H.

Preferred as oligotriazine ethers in the molding materials of polymers containing triazine segments are 4- to 8-ring oligotriazine ethers that contain 4 to 8 triazine cycles in the macromolecule.

In the molding materials of polymers containing triazine segments, the oligotriazine ethers in the mixtures are preferably oligotriazine ethers with R$_3$=H.

Preferably, the mixtures of oligotriazine ethers in the molding materials of polymers containing triazine segments contain 70 to 90 wt % of oligotriazine ethers in linear linking.

The products of polymers containing triazine segments are preferably produced from molding materials that contain mixtures of oligotriazine ethers with 70 to 90 wt % of oligotriazine ethers, in which the triazine segments are linked by —NH—CHR$_3$—NH— groups.

The bridging bonds with linear linking of the triazine rings of type I to III for X=CHR3 have the structure

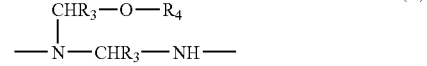

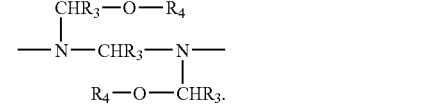

When X=CHR$_3$—O—CHR$_3$ the bridging bonds of type I to III have the structure

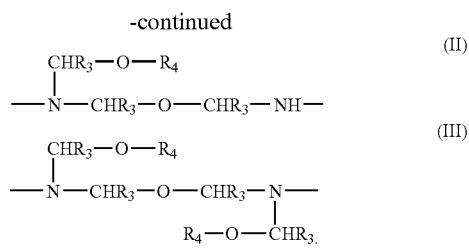

The mixtures of oligotriazine ethers in the molding materials of polymers containing triazine segments can be mixtures of oligotriazine ethers with the same or a different substituent $R_2$=—$NH_2$, —NH—$CHR_3$—$OR_4$, —N[$CHR_3$—O—$R_4$]$_2$, —$CH_3$, —$C_3H_7$, —$C_6H_5$, —OH, phthalimido-, succinimido-.

Examples of suitable fillers that can be contained in the molding materials of polymers containing triazine segments up to 75 wt %, are $Al_2O_3$, $Al(OH)_3$, barium sulfate, calcium carbonate, glass beads, silica, mica, silica flour, powdered slate, microballoons, carbon black, talc, powdered stone, wood flour, cellulose powder and/or hull and pit flours such as peanut hull flour or olive pit flour. Preferable as fillers are phyllosilicates of the type montmorillonite, bentonite, kaolinite, muscovite, hectorite, fluorohectorite, kanemite, revdite, grumantite, ilerite, saponite, beidelite, nontronite, stevensite, laponite, taneolite, vermiculite, halloysite, volkonskoite, magadite, rectorite, kenyaite, sauconite, borofluoroflogopite and/or synthetic smectites.

Examples of suitable reinforcing fibers, that can be contained in the molding-materials of polymers containing triazine segments up to 75 wt %, are inorganic fibers, in particular glass fibers and/or carbon fibers, natural fibers, in particular cellulose fibers such as flax, jute, kenaf and wood fibers, and/or synthetic fibers, in particular fibers or polyacrylonitrile, polyvinyl alcohol, polyvinyl acetate, polypropylene, polyesters and/or polyamides.

Examples of reactive polymers of the type ethylene copolymers that can be contained in the products, in particular molding materials of polymers containing triazine segments up to 50 wt %, are partially saponified ethylene vinyl acetate copolymers, ethylene butyl acrylate acrylic acid copolymers, ethylene hydroxyethyl acrylate copolymers, or ethylene butyl acrylate glycidyl methacrylate copolymers Examples of reactive polymers of the type maleic acid anhydride copolymers that can be contained in the products, in particular molding materials of polymers containing triazine segments up to 50 wt %, are $C_2$–$C_{20}$ olefin maleic acid anhydride copolymers or copolymers of maleic acid anhydride and $C_8$–$C_{20}$ vinyl aromatics.

Examples of the $C_2$–$C_{20}$ olefin components that can be contained in the maleic acid anhydride copolymers are ethylene, propylene, butene-1, isobutene, diisobutene, hexene-1, octene-1, heptene-1, pentene-1,3-methyl butene-1,4-methyl pentene-1, methyl ethyl pentene-1, ethyl pentene-1, ethyl hexene-1, octadecene-1 and 5,6-dimethyl norbornen.

Examples of the $C_8$–$C_{20}$ vinyl aromatic components that can be contained in the maleic acid anhydride copolymers are styrene, α-methylstyrene, dimethylstyrene, iso-propenylstyrene, p-methylstyrene and vinylbiphenyl.

The modified maleic acid anhydride copolymers alternatively contained in the products, in particular the molding materials of polymers containing triazine segments are preferably partially or completely esterified, amidated, or imidated maleic acid anhydride copolymers Particularly suitable are modified copolymers of maleic acid anhydride and $C_2$–$C_{20}$ olefins or $C_8$–$C_{20}$ vinyl aromatics with a ratio of 1:1 to 1:9 and weight-average molecular weight of 5000 to 500000 that have been reacted with ammonia, $C_1$–$C_{18}$ monoalkyl amines, $C_6$–$C_{18}$ aromatic monoamines, $C_2$–$C_{18}$ monoaminoalcohols, monoaminated poly($C_2$–$C_4$-alkylene)oxides with a molar mass of 400 to 3000, and/or mono-etherified poly($C_2$–$C_4$-alkylene)oxides with a molar mass of 100 to 10000, where the molar ratio of anhydride group copolymer/ammonia, amino group $C_1$–$C_{18}$ monoalkylamines, $C_6$–$C_{18}$ aromatic monoamines, $C_2$–$C_{18}$ monoaminoalcohols or monoaminated poly-($C_2$–$C_4$-alkylene)oxide and/or hydroxy group poly-($C_2$–$C_4$-alkylene) oxide is 1:1 to 20:1.

Examples of reactive polymers of the type poly(meth) acrylates that can be contained in the products, in particular the molding materials of polymers containing triazine segments up to 50 wt % are copolymers based on functional unsaturated (meth)acrylate monomers such as acrylic acid, hydroxyethyl acrylate, glycidyl acrylat, methacrylic acid, hydroxybutyl methacrylate, or glycidyl methacrylate and nonfunctional (meth)acrylate monomers such as ethyl acrylate, butyl acrylate, ethylhexyl acrylate, methyl methacrylate, ethyl acrylate and/or butyl methacrylate and/or $C_8$–$C_{20}$ vinyl aromatics. Preferable are copolymers based on methacylic acid, hydroxyethyl acrylate, methyl methacrylate, and styrene.

Examples of reactive polymers of the type polyamides that can be contained in the products, in particular the molding materials of polymers containing triazine segments up to 50 wt %, are polyamide-6, polyamide-6,6, polyamide-6,36, polyamide-11, polyamide-12, polyaminoamides from polycarboxylic acids and polyalkylene amines as well as the corresponding methoxylierten polyamides.

Examples of reactive polymers of the type polyesters that can be contained in the products, in particular molding materials of polymers containing triazine segments up to 50 wt %, are polyesters with molar masses of 2000 to 15000 aus saturated dicarboxylic acids such as phthalic acid, isophthalic acid, adipinic acid and/or succinic acid, unsaturated dicarboxylic acids such as maleic acid, fumaric acid and/or itaconic acid and diols such as ethylene glycol, butanediol, neopentyl glycol and/or hexanediol. Preferable are branched polyesters based on neopentyl glycol, trimethylol propane, isophthalic acid and azelaic acid.

Examples of reactive polymers of the type polyurethanes, that can be contained in the products, in particular molding materials of polymers containing triazine segments up to 50 wt %, are uncrosslinked polyurethanes based on toluene diisocyanate, diphenylmethane diisocyanate, butane diisocyanate and/or hexanediisocynate as diisocyanate components and butandiol, hexandiol and/or polyalkylene glycols as diol components with molar masses of 2000 to 30000.

Examples of suitable stabilizers and UV absorbers that can be contained in the products, in particular molding materials of polymers containing triazine segments up to 2 wt %, are piperidine derivates, benzophenone derivates, benzotriazole derivates, triazine derivatives and/or benzofuranone derivates.

Examples of suitable auxiliary agents, that can be contained in the molding materials of polymers containing triazine segments up to 2 wt %, are latent hardeners such as ammonium sulfate and/or ammonium chloride and/or processing auxiliary agents such as calcium stearate, magnesium stearate and/or waxes.

Examples of the auxiliary agents contained in the molding materials for the production of products of polymers containing triazine segments are latent hardeners such as ammonium sulfate or ammonium chloride and/or processings auxiliary agents such as calcium stearate, magnesium stearate and/or waxes.

Preferred are the fillers or adsorbing materials $Al_2O_3$, $Al(OH)_3$, $SiO_2$, barium sulfate, calcium carbonate, glass beads, silica, mica, silica flour, powdered slate, microballoons, carbon black, talc, phyllosilicates, molecular sieves, powdered stone, wood flour, cellulose and/or cellulose derivates contained in the molding materials.

Particularly preferable as fillers are phyllosilicates of the type montmorillonite, bentonite, kaolinite, muscovite, hectorite, fluorohectorite, kanemite, revdite, grumantite, ilerite, saponite, beidelite, nontronite, stevensite, laponite, taneolite, vermiculite, halloysite, volkonskoite, magadite, rectorite, kenyaite, sauconite, borofluoroflogopite and/or synthetic smectites.

Hull and pit flours such as peanut hull flour or olive pit flour can also be contained in the products of polymers containing triazine segments as fillers.

Particularly preferable as adsorbing materials in the products of polymers containing triazine segments are phyllosilicates of the type montmorillonite, bentonite, hectorite, silicate-type molecular sieves with varying aluminium content, in particular of the type A, X, Y, particularly preferably 5A, silicon dioxide-based adsorbers, microballoons, cellulose and/or cellulose derivates.

These swellable adsorbing materials are used in the production of the products of polymers containing triazine segments for the adsorption of liberated volatile condensation products.

In particular, products of the manufacturer Chemiewerk Bad Köstritz, German (Köstrosorb types) have proven suitable as silicon dioxide-based adsorbers Also suitable are adsorbers based on polyacrylic acid.

The reinforcing fibers contained in the products of polymers containing triazine segments are preferably inorganic fibers, in particular glass fibers and/or carbon fibers, natural fibers, in particular cellulose fibers as well as flax, jute, kenaf and wood fibers, and/or synthetic fibers, in particular fibers made of polyacrylonitrile, polyvinyl alcohol, polyvinyl acetate, polypropylene, polyesters and/or polyamides.

The products, in particular molding materials of polymers containing triazine segments are produced according to the invention by a method in which mixtures that consist of meltable 4- to 18-ring oligotriazine ethers soluble in highly polar solvents of the type $C_1$–$C_{10}$ alcohols, dimethyl formamide or dimethyl sulfoxide, based on aminotriazine ether of the structure

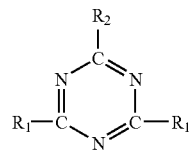

where:

$R_1$=$R_4$—O—$CHR_3$—NH—; [$R_4$—O—$CHR_3$]$_2$N—

$R_2$=—$NH_2$, —NH—$CHR_3$—$OR_4$, —N[$CHR_3$—O—$R_4$]$_2$, —$CH_3$, —$C_3H_7$, —$C_6H_5$ $R_3$=H or $C_1$–$C_7$-alkyl; and $R_4$=$C_1$–$C_{18}$-alkyl; H, where the triazine segments in the oligotriazine ethers are represented by:

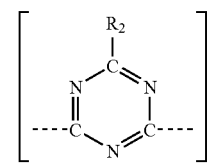

where:

$R_2$=—$NH_2$, —NH—$CHR_3$—$OR_4$, —N[$CHR_3$—O—$R_4$]$_2$, —$CH_3$, —$C_3H_7$, or —$C_6H_5$, $R_3$=H or $C_1$–$C_7$— alkyl; and $R_4$=$C_1$–$C_{18}$-alkyl; or H, are linked by bridging bonds to 4- to 18-ring oligotriazine ethers with linear and/or branched structure, the bridging bonds form type I to III with linear linking of the triazine rings

 (I)

 (II)

and/or

 (III)

where X=$CHR_3$ and alternatively $CHR_3$—O—$CHR_3$, and the bridging bonds with branched structure (z>v+2; z=number of bonded triazine rings; v=number of branching points) are both bridging bonds of type I to III in the linear chain segments and bridging bonds of the type IV to VII in the highly branched chain segments (z=v+2)

 (IV)

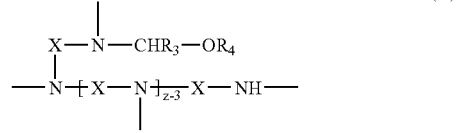 (V)

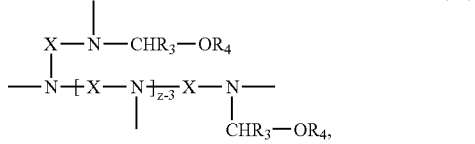 (VI)

where X=$CHR_3$ and alternatively $CHR_3$—O—$CHR_3$,

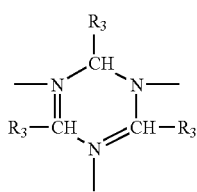

(VII)

where:

$R_3$=H or $C_1$–$C_7$— alkyl; and $R_4$=$C_1$–$C_{18}$— alkyl; or H, where the substituent $R_4$ in the aminotriazine ethers or oligotriazine ethers is exclusively $C_1$–$C_{18}$-alkyl or predominantly $C_1$–$C_{18}$-alkyl, where in the oligotriazine ethers the molar ratio of ether groups/triazine segments is 1:2 to 4.5:1, where oligotriazine ethers, in which in the bridging bonds X=$CHR_3$—O—$CHR_3$, may be contained up to 35 wt % in the molding materials of polymers containing triazine segments, and where the products, in particular the molding materials of polymers containing triazine segments can contain alternatively up to 75 wt % fillers and/or reinforcing fibers, up to 50 wt % other reactive polymers of the type ethylene copolymers, maleic acid anhydride copolymers, modified maleic acid anhydride copolymers, poly(meth)acrylates, polyamides, polyesters and/or polyurethanes, as well as up to 2 wt % stabilizers, UV absorbers and/or auxiliary agents, are produced using a multistage method, in which in the first process stage precondensates of $C_1$–$C_8$ aldehydes and triazine derivatives of the structure

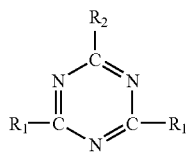

where:

$R_1$=—$NH_2$, and $R_2$=—$NH_2$, —$CH_3$, —$C_3H_7$, —$C_6H_5$, —OH, phthalimido-, or succinimido-, with a molar ratio of triazine derivative/aldehyde 1:1 to 1:4 are etherified by reaction with $C_1$–$C_4$-alcohols in the presence of ionic catalysts at 5 to 100° C. and the $C_1$–$C_4$-alkyl-oxa-$C_1$–$C_8$-alkylene-amino-substituted triazine derivatives obtained are alternatively transformed by transetherification with $C_4$–$C_{18}$-alcohols with distillation off of $C_1$–$C_4$-alcohols at 80 to 120° C. in $C_4$–$C_{18}$-alkyl-oxa-$C_1$–$C_8$-aikylene-amino-substituted triazine derivatives, where depending the ratio of hydroxy-$C_1$–$C_8$-alkylene-amino-groups/alcohol used complete or preponderant etherification of the hydroxy groups of the hydroxy-$C_1$–$C_8$-alkylene-amino-triazine is obtained, in the second process stage for reprocessing of the etherified precondensate, unreacted alcohol and water are separated out of the neutralized reaction batch, and alternatively the melt of the aminotriazine ethers at 70 to 120° C. in 70 to 150 wt %, based on theaminotriazine ethers, $C_3$- to $C_6$-alcohols is dissolved and after cooling to 15 to 40° C. insoluble portions are separated out and the $C_3$- to $C_6$-alcohols added are evaporated at 70 to 140° C. up to to a residual content of 5 to 20 wt %, whereby in the second process stage a pH of 7 to 10 is maintained, in the third-process-stage for condensation of the aminotriazine ethers into oligotriazine ethers, the melt obtained, which contains $C_1$–$C_{18}$-alkyl-oxa-$C_1$–$C_8$-alkylene-amino-substituted triazine as well as small portions small portions of oligotriazine ethers and of unreacted or unseparated alcohol, alternatively after temperature control of 20 to 120 min at 70 to 140° C., is measured into a continuous kneader, reacted with a residence time of 2 to 12 min at 140 to 220° C. with degassing, and the oligotriazine ethers, alternatively with dosing of up to 75 wt % fillers and/or reinforcing fibers, other reactive polymers of the type ethylene copolymers, maleic acid anhydride copolymers, modified maleic acid-anhydrid-copolymere, poly(meth)acrylates, polyamides, polyesters and/or polyurethane, as well as up to 2 wt %, based in each case on the oligotriazine ethers, stabilizers, UV absorbers and/or auxiliary agents in the melt, alternatively after melt filtration, are discharged and granulated, and where precondensates used in the first process stage are produced from triazine derivatives and $C_1$–$C_8$-aldehydes alternatively in a reaction stage upstream from the first process stage by hydroxyalkylation of triazine derivatives with $C_1$–$C_8$-aldehydes in $C_1$–$C_4$-alcohols or mixtures of 70 to 99 wt % $C_1$–$C_4$-alcohols and 30 to 1 wt % of water, alternatively in the presence of ionic catalysts, at 45 to 90° C. and residence times of 15 to 140 min, and the solutions of the precondensates from triazine derivatives and $C_1$–$C_8$-aldehydes, alternatively after neutralization, are used directly in the etherification in the first process stage.

The precondensates from triazine derivatives and $C_1$–$C_8$ aldehydes used in the first process stage are precondensates that contain as $C_1$–$C_8$ aldehyde components, in particular formaldehyde, acetaldehyde and/or trimethylol acetaldehyde and as a triazine derivative in particular melamine, acetoguanamine and/or benzoguanamine. Particularly preferable are precondensates of melamine and formaldehyde with a molar ratio of melamine/formaldehyde 1:1 to 1:2.

Stirred tank reactors with bottom discharge and descending condenser are suitable as reactors for performance of the first and second process stage.

The catalysis of the etherification in the first process stage as well as the hydroxyalkylation in the reaction stage upstream from the first process stage can be carried out as homogeneous catalysis in the presence of soluble ionic catalysts or as heterogeneous catalysis in the presence of ion exchangers or zeolites.

Preferably, the etherification of precondensates of $C_1$–$C_8$-aldehydes and triazine derivatives takes place in the first process stage in the presence of acidic catalysts at a pH of 3 to 4.

For the transetherification with $C_4$–$C_{18}$-alcohols, it is advantageous to adjust the pH of the alcohol to pH=2 to 7.

Examples of $C_4$–$C_{18}$-alcohols for the transetherification of the $C_1$–$C_4$-alkyl-oxa-$C_1$–$C_8$-alkylene-amino-substituted triazine derivatives produced in the first process stage are butanol, ethylhexanol, octyl alcohol, lauryl alcohol and stearyl alcohol. The transetherification with $C_4$–$C_{18}$-alcohols takes place at 60 to 90° C. with distillation off of the $C_1$–$C_4$-alcohols from the $C_1$–$C_4$-alkyl-oxa-$C_1$–$C_8$-alkylene-amino-substituted triazine derivative.

Organic or inorganic acids, bases, ion exchange resins and/or acidic zeolites are preferably used in the method according to the invention as ionic catalysts and/or for the neutralization of the reaction batch.

Examples of acids used are hydrochloric acid, nitric acid, sulfuric acid, formic acid, or acetic acid.

Examples of suitable ion exchange resins as heterogeneous catalysts are chlormethylated copolymers of styrene and divinyl benzene aminated with trimethylamine, sulfonated copolymers of styrene and divinyl benzene, and m-phenylenediamine-formaldehyde copolymers.

The advantage of the use of ion exchanger resins consists in that with heterogeneous catalysis all process stages that comprise the neutralization and separation of salts can be eliminated.

If the etherification in the first process stage takes place under homogeneous catalysis with hydrochloric acid as an acidic catalyst, alcoholic solutions of alkali metal hydroxides are preferably used for the neutralization of the reaction mixture in the second process stage. Pressure filters are suitable for the separation of the precipitated salts. The evaporation of the residual content of $C_3$–$C_6$-alcohols can take place in continuous film evaporators with a discharge screw.

If, in the second process stage in the reprocessing of the etherified precondensate, unreacted alcohol and water are separated from the neutralized reaction batch by distillation, the distillation preferably takes place at 50 to 90° C./0.01 to 0.2 bar.

By controlling the temperature of the aminotriazine ethers at 70 to ~140° C. in the third process stage in the method according to the invention for production of products, in particular molding materials of polymers containing triazine segments, condensation is already initiated before measured feeding into the continuous kneader. Twin screw extruders L/D=32–48 with a counter-rotating screw arrangement and a plurality of degassing zones are preferred as continuous kneaders. For removal of inhomogeneities, the melt can be fed by a gear pump into a melt filter. The conversion of the melt into granulate particles can take place in pelletizers by dosing the melt via a feed arrangement onto a continuous steel strip and cooling and solidification of the deposited pellets.

The proportion of the oligotriazine ethers in which X=CHR$_3$—O—CHR$_3$ in the bridging bonds is determined by the residence time in the extruder and the material temperature in the extruder in the third process stage. With short residence times and low material temperatures in the extruder, oligotriazine ethers, in which X=CHR$_3$—O—CHR$_3$ in the bridging bonds, can be contained up to 35 wt % in the molding materials of polymers containing triazine segments. With long residence times and high material temperatures in the extruder, only oligotriazine ethers in which X=CHR$_3$ in the bridging bonds are formed.

It is advantageous, in the method according to the invention for production of molding materials of polymers containing triazine segments, to use solutions of aminoplast precondensates that are produced directly in an upstream process stage.

If one starts with the triazine derivate in the production of products, in particular molding materials of polymers containing triazine segments in a reaction stage upstream from the first process stage, preferably in the hydroxyalkylation of the triazine derivative a methanolic formaldehyde solution with a solid content of 40 to 50 wt % that is produced by dissolution of paraformaldehyde in methanol water mixtures is used. Advantageous process conditions for the hydroxyalkylation in the upstream reaction stage in batch reactors are residence times of 30 min at 50° C. or 20 min at 70° C.

Examples of the triazine derivatives used in the upstream reaction stage are melamine, acetoguanamine or benzoguanamine.

Preferably, the hydroxyalkylation of triazine derivatives with $C_1$–$C_8$ aldehydes occurs in the reaction stage upstream from the first process stage in the presence of alkaline catalysts at pH 8 to 9.

The neutralization of the reaction batch in the reaction stage upstream from the first process stage is preferably performed using ion exchangers, with the alkaline solution of the precondensate continuously fed into a stream tube filled with an ion exchanger.

A preferred variant for obtaining a high degree of etherification in the first process stage consists in that the etherification is carried out in the presence of 10 to 300 wt %, based on the dry substance of the precondensate used, molecular sieves.

Examples of suitable molecular sieves are natural or synthetic zeolites. Additions of more than 100 wt %, based on the dry substance of the precondensate used, of molecular sieves during etherification are advantageous, when aqueous solutions of melamine resin precondensates are used.

When the production of the precondensates from triazine derivatives and $C_1$–$C_8$-aldehydes takes place in the reaction stage upstream from the first process stage, it is advantageous, for obtaining a high degree of etherification in the first process stage, to carry out the etherification of the precondensates with $C_1$–$C_4$-alcohols in two reaction steps.

A particularly advantageous variant of the method according to the invention for production of products, in particular molding materials of polymers containing triazine segments is the simultaneous performance of the reaction stage upstream from the first process stage and of the first process stage in one process step, with mixtures of alkaline and acid ion exchange resins with a ratio of the ion exchange capacities of 1:1.15 to 1:1.7 used as catalysts.

The particular advantage of the products according to the invention, in particular molding materials of polymers containing triazine segments, consists in that they, because of the higher melt viscosity compared to customary triazine derivative precondensates, such as melamine formaldehyde precondensates or guanamine formaldehyde precondensates, can be processed using fusion methods like thermoplasts. Preferred areas of application are hot-melt adhesives as well as the production of sheets, tubes, profiles, injection molded parts, fibers, coatings, hollow articles, and foamed materials.

The products according to the invention, in particular molding materials of oligotriazine ethers are soluble in polar solvents of the type $C_1$–$C_{10}$-alcohols, dimethyl formamide or dimethyl sulfoxide in concentrations to 60 wt %. The solutions or dispersions are suitable for use as adhesives, impregnation agents, paint resin or laminating resin formulations or for the production of foams, microcapsules or fibers. The advantages of solutions or dispersions of the oligotriazine ethers compared to the corresponding triazine resin precondensates consist in the higher viscosity and the resultant improved flow properties or higher resistances of uncured intermediate products in fiber or foam production.

The products of polymers containing triazine segments are produced according to a method, in which the molding materials according to the invention, that consist of mixtures of meltable 4- to 18-ring oligotriazine ethers based on triazine ethers of the structure

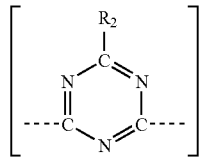

where:

$R_2 =$ —$NH_2$, —NH—$CHR_3$—$OR_4$, —N[$CHR_3$—O—$R_4$]$_2$, —$CH_3$, —$C_3H_7$, or —$C_6H_5$, $R_3 =$ H or $C_1$–$C_7$-alkyl; and $R_4 = C_1$–$C_{18}$-alkyl; or H, that are linked by bridging bonds to 4- to 18-ring oligotriazine ethers with linear and/or branched structure, the bridging bonds form type I to III with linear linking of the triazine rings

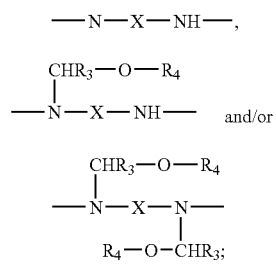

where X=$CHR_3$ and alternatively $CHR_3$—O—$CHR_3$, and the bridging bonds with branched structure (z>v+2; z=number of bonded triazine rings; v=number of branching points) are both bridging bonds of type I to III in the linear chain segments and bridging bonds of the type IV to VII in the highly branched chain segments (z=v+2)

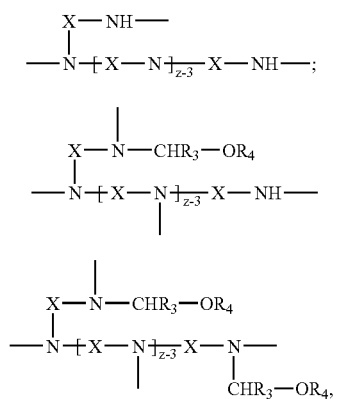

Where X=$CHR_3$ and alternatively $CHR_3$—O—$CHR_3$,

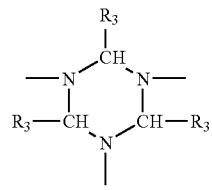

where $R_3$=H or $C_1$–$C_7$-alkyl; and $R_4 = C_1$–$C_{18}$-alkyl; or H, where the substituent $R_4$ in the aminotriazine ethers or oligotriazine ethers is exclusively $C_1$–$C_{18}$-alkyl or predominantly $C_1$–$C_{18}$-alkyl, where in the oligotriazine ethers the molar ratio of ether groups/triazine segments is 1:2 to 4.5:1, where oligotriazine ethers, in which in the bridging bonds X=$CHR_3$—O—$CHR_3$, may be contained up to 35 wt % in the molding materials of polymers containing triazine segments, and where products of polymers containing triazine segments can contain up to 75 wt % fillers or adsorbing materials and/or reinforcing fibers, up to 50 wt % of other reactive polymers of the type ethylene copolymers, maleic acid anhydride copolymers, modified maleic acid anhydride copolymers, poly-(meth)acrylate, polyamides, polyesters and/or polyurethanes, as well as up to 2 wt % stabilizers, UV absorbers and/or auxiliary agents, in continuous kneaders at material temperatures of 105 to 220° C. and residence times of 2 to 12 min, alternatively with addition of up to 300 wt % fillers and/or reinforcing fibers, up to 100 wt % of other reactive polymers of the type ethylene copolymers, maleic acid anhydride copolymers, modified maleic acid anhydride copolymers, poly(meth)acrylates, polyamides, polyesters, and/or polyurethanes, as well as up to 2 wt %, based in each case on the oligotriazine ethers used, stabilizers, UV absorbers and/or auxiliary agents, are melted and with curing of the oligotriazine ethers using conventional processing methods for thermoplastic polymers A) are discharged as a melt onto a calender and withdrawn as sheets via conveyor belts and cut or sealed onto flat sheets of metal foils, plastic films, paper webs or textile webs and withdrawn as multicomponent composites and packaged, or B) are discharged via a profile die and withdrawn as profiles or sheets, cut and packaged, or C) are discharged via a ring die, withdrawn with injection of air as tubing, cut and packaged, or D) are discharged after dosing of foaming agents via a slot die and withdrawn as foamed sheets, or E) are discharged via the slot die of a tube coating system and and sealed as molten liquid onto the rotating tube, or F) are processed into injection molded parts in injection molding machines, preferably with three-zone screws with a screw length of 18 to 24 D, high injection speeds and at mold temperatures of 5 to 70° C., or G) extruded into melt spinning systems by melt pumps through the capillary tool into the blowing pipe and withdrawn as threads or separated as fibers using the melt blow method, or discharged as melts using the rotation spinning method into a shear field chamber with organic dispersants form fibrous fibrids, and and further processed in downstream equipment, or H) metered by the resin infusion method into an open mold with the semifinished fiber and made into laminates using vacuum bag technology, or I) are injected by the resin injection method into a locking mold, in which preforms made of textile material are located and are shaped into components and hardened, or K) for the hot melt impregnation of component blanks produced by the winding method, braiding method or pultrusion method are used, and the products are alternatively subjected to complete curing of a thermal posttreatment at temperatures of 180 to 220° C. and residence times of 30 to 120-min.

The molding materials used for the production of products of polymers containing triazine segments can be provided in the form of cylindrical, lenticular, pellet-shaped or spherical particles with an average diameter of 0.5 to 8 mm.

For the production of products, that contain fillers, reinforcing fibers, additional reactive polymers, stabilizers, UV absorbers and/or auxiliary agents, molding materials in which these components are already contained can be used, or the components are added at the time of the processing of the molding materials.

For the hot-melting of the molding materials of polymers containing triazine segments using the method according to the invention, extruders with short compression screws or 3-zone screws with L/D=20–40 are suitable as continuous kneaders. Preferred are 5-zone screws with a feed zone, a compression zone, shearing zone, decompression zone, and homogenization zone. Screws with cutting depths of 1:2.5 to 1:3.5 are preferably suitable. Particularly advantageous is the intermediate connection of static mixers or melt pumps between cylinder and die.

Advantageous material temperatures for the fused molding materials of polymers containing triazine segments during processing using calender technology for sheet or coatings or in the production of sheets, profiles or tubes through discharge from a profile die lie in the range from 110 to 150° C.

In the production of foamed sheets through discharge via a slot die, molding materials of polymers containing triazine segments can be used that contain gas-liberating foaming agents such as sodium hydrogen carbonate, azodicarbonamide, citric acid/bicarbonate foaming systems and/or cyanurotrihydrazide, or volatile hydrocarbons such as pentane, isopentane, propane, and/or isobutane, or gases such as nitrogen, argon, and/or carbon dioxide are dosed into the melt before discharge. Advantageous die temperatures for the discharge of the melt containing foamnig agent are 110 to 135° C. Preferred foam densities of the foams of polymers containing the triazine segments are in the range from 10 to 500 kg/m$^2$.

For the extrusion coating of metal tubes, material temperatures of the melts of polymers containing the triazine segments from 135° C. to 190° C. and preheating of the tube material to 100 to 140° C. are required.

Preferably, with the method according to the invention for production of injection molding products of polymers containing triazine segments, injection molding machines with injection units that have 3-zone screws with a screw length of 18 to 24 D are used.

The injection speed during the production of molded parts produced by injection molding should be set as high as possible to rule out sunk spots and bad flow lines.

In the production of fiber products of polymers containing triazine segments, for the uniform melt dosing of the molding materials melted in the plasticizer extruder via the melt distributor to the capillary tool, diphenyl-heated melt pumps are preferably used for the melts heated to 120–180° C.

The production of filament yarns of polymers containing triazine segments can occur in short spinning installations through the drawing of threads using fast moving godets with thread drawing speeds of 60 to 450 m/min and further processing in downstream equipment consisting of a curing chamber, stretcher, and winder.

Fibers or mats as products of polymers containing triazine segments can likewise be produced using the melt blow method through application of a superheated stream of air around the capillary die openings during extrusion of the threads from the capillary tool into the blowing pipe. The stream of air stretches the molten threads with simultaneous division into many individual fibers with fiber diameters of 0.5 to 12 μm. Further processing of the fibers deposited on the screen conveyor belt into mats can occur through application of thermobonding or needling processes to obtain the necessary strength and dimensional stability.

Fiber-reinforced plastics made with the resin infusion method can be produced by impregnation of the semifinished fiber products using the melt of the molding material of triazine ethers at ambient pressure, which is pressed into the evacuated vacuum bag using an open mold.

Two-dimensional or complex-shaped components made with the resin injection method are produced by placing preforms of nonimpregnated textiles in a lockable mold, injection of the melt of the molding material of triazine ethers, and hardening.

Rotationally symmetric components produced by the winding method, complex components by the round braiding technique of profiles by the pultrusion technique can be produced by impregnation of fiber blanks in the form of tubes, fittings, containers or profiles with the melt of the molding material of triazine ether.

Preferably, fiber products of polymers containing triazine segments in the form of fibrous fibrids are produced by
feeding of the melt via feed dies at fusion temperatures of 105 to 130° C. into a shear field chamber that contains high boiling organic dispersant, preferably paraffin oil or motor oil, heated to 95 to 135° C., wherein acid gases, preferably hydrochloric acid or sulfur dioxide, are introduced into the shear field chamber, and wherein the molten strand leaving the feed die is drawn through the oil swirled by the rotor and dispersed forming fibers,
transfer of the dispersion of the fibrous fibrids formed in organic dispersants in a sieve separator with simultaneous extraction of the high-boiling dispersant with low-boiling hydrocarbons, preferably hexane or heptane,
discharge of the fibrous fibrid-chopped strand mat and alternatively secondary thermal curing of the chopped strand mat at temperatures of 180 to 210° C. and residence times of 40 to 120 min.

The products of polymers containing triazine segments are in particular for applications with high requirements for flame resistance and thermal stability in the building and construction industry, mechanical engineering, and the auto industry, preferably in the form of foam sheets as insulation components, in the form of sheets as trim elements, in the form of tubes and hollow profiles in ventilation technology, in the form of injection molded parts as functional parts as well as in the form of fibers in particular for the production of electrical insulating papers, fireproof clothing, apparel for high working temperatures, fireproof roofs, filter mats, felts for paper machines as well as motor vehicle or machine insulation covers, in the form of fiber reinforced plastic components made with the resin infusion method, in the form of sandwich components made with the resin injection method as well as in the form of complex components, containers, or profiles made with the filament winding, braiding, or pultrusion method.

The invention is illustrated by the following examples:

EXAMPLE 1

In a first process stage, 4.8 kg of a powdered melamine formaldehyde precondensate (Lamelite 200, Agrolinz Melamin) is disseminated via a dosing belt weigher into a 50-L stirred tank reactor, in which 12 kg of methanol and 320 mL of concentrated hydrochloric acid were placed in advance, at 32° C. with stirring for a period of 2 hours. After complete dissolving of the precondensate, stirring continues for one additional hour at 35° C., the reaction batch is adjusted with 20% methanolic KOH to a pH of 9.5, and the methanol water mixture is distilled off at 50° C. to 80° C./15 mbar. 27 L butanol is added to the residue, the pH is adjusted with hydrochloric acid to pH 5, and the reaction mixture is gradually heated from 95 to 115° C., until the liberated methanol is distilled off.

After cooling to 80° C. in the second process stage for purification of the etherified precondensate, the etherified and partially transetherified precondensate produced in the first process stage is adjusted with 20% methanolic KOH to a pH of 10.2 and the precipitated salts separated out in a pressure filter. The butanolic solution of the partially etherified precondensate is transferred to a laboratory film evaporator with a discharge screw and butanol distilled off to a residual proportion of 14%.

In the third process stage for condensation of the aminotriazine ethers to oligotriazine ethers, the melt is temperature controlled for 30 min at 90° C. and the concentrated liquid resin is dosed by means of a dosing pump into a Leistritz twin screw extruder of the type Micro 27-44 D with counter-rotating screws and three degassing zones. The liquid resin is first degassed in the extruder at a material temperature of 140° C./40 mbar and then recondensed at a material temperature of 185° C. under vacuum. After a residence time in the extruder of 6 min, the oligotriazine ether is fed by a melt gear pump (type extrex SP, Maag pump systems) into a self-cleaning melt filter and, for forming, is shaped into pellets in a pelletizer with a cooling conveyor.

The resulting pellets of the oligotriazine ethers mixture are fully soluble in dimethyl sulfoxide. GPC analyses yield a weight-average molecular weight of 1620.

NMR analyses indicated that the oligotriazine ether mixture consists of 84 wt % linear aminotriazine ethers and 16 wt % chain branched aminotriazine ethers. The bridging bonds between the triazine rings with linear linking form predominantly —NH—CH$_2$—NH— and to a lesser extent —NH—CH$_2$—O—CH$_2$—NH— units, in addition, —N(CH$_2$—OC$_4$H$_9$)—CH$_2$—NH— or —N(CH$_2$—OCH$_3$)—CH$_2$—O—CH$_2$—NH— units are present to a very small extent as bridging bonds.

As bridging bonds with chain branching, bridging bonds of the type

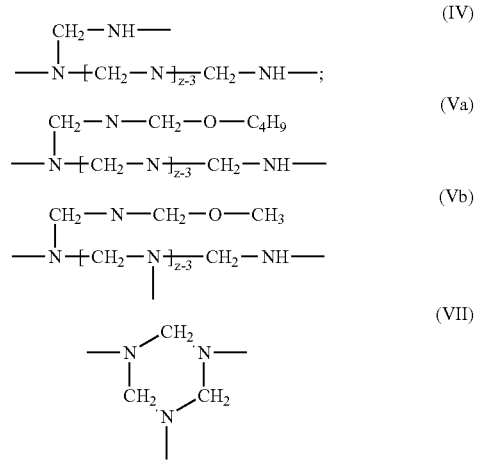

and to a lesser extent

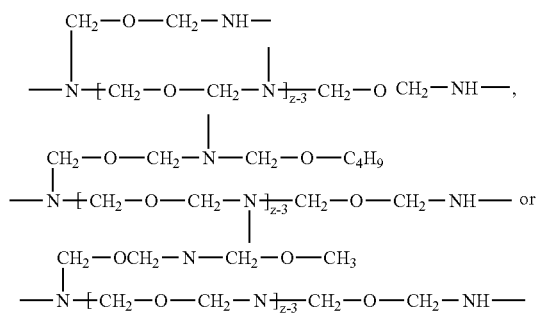

were identified by NMR-spectroscopy. The ratio of butyl ether groups/methyl ether groups is about 1:1.

EXAMPLE 2

In an upstream reaction stage for the production of the precondensate, 5.16 kg paraformaldehyde and 2.4 kg water are dosed into a 50-L stirred tank reactor that contains 2.4 kg methanol, adjusted to a pH of 8.2 by addition of 0.1 n methanolic KOH, and stirred 30 min at 50° C. To the suspension, 4.4 kg melamine and 0.7 kg acetoguanamine are added, heated for 10 min to 71° C., and stirred for an additional 10 min while raising the temperature to 75° C.

After cooling to 57° C., in the first process stage for the etherification of the precondensate produced in the upstream reaction stage, an additional 12 kg of methanol is added, the reaction batch adjusted with concentrated hydrochloric acid to a pH of 4.7, and stirred an additional 45 min at this temperature.

In a second step of the first process stage, the partially etherified precondensate is adjusted with 20% methanolic KOH to a pH of 10.2, and methanol and water distilled off at 80° C./50 mbar. The reaction batch is dissolved with addition of 12 kg methanol, adjusted with concentrated hydrochloric acid to a pH of 4.5, and etherified for 1 hour at 55° C. After adjustment to a pH of 9.5 with 20% methanolic KOH, the reaction batch is concentrated down at 80° C./10 mbar.

For purification, the melt is dissolved in 6 kg butanol in the second process stage and the precipitated salts separated out in a pressure filter. The butanolic solution of the etherified precondensate is transferred to a laboratory film evaporator with a discharge screw and butanol distilled off to a residual proportion of 12%.

In the third process stage for condensation of the aminotriazine ethers to oligotriazine ethers, the melt is temperature controlled 20 min at 100° C. and the concentrated liquid resin is dosed by means of a dosing pump into a Leistritz twin screw extruder of the type Micro 27-44 D with counter-rotating screws and three degassing zones. The liquid resin is first degassed in the extruder at a material temperature of 140° C./50 mbar and then recondensed at a material temperature of 190° C. under vacuum.

After a residence time in the extruder of 6.5 min, the oligotriazine ether is fed by a melt gear pump (type extrex SP, Maag pump systems) into a self-cleaning melt filter and, for forming, is shaped into pellets in a pelletizer with a cooling conveyor.

The resulting pellets of the oligotriazine ethers mixture are fully soluble in dimethyl sulfoxide. GPC analyses yield a weight-average molecular weight of 1450. NMR analyses indicated that the oligotriazine ether mixture consists of 88 wt % linear aminotriazine ethers and 12 wt % chain branched aminotriazine ethers. The bridging bonds between the triazine rings with linear linking form predominantly —NH—CH$_2$—NH— and to a lesser extent —NH—CH$_2$—O—CH$_2$—NH— units, in addition, —N(CH$_2$—OCH$_3$)—CH$_2$—NH— units are present to a very small extent as bridging bonds.

As bridging bonds with chain branching, bridging bonds of the type

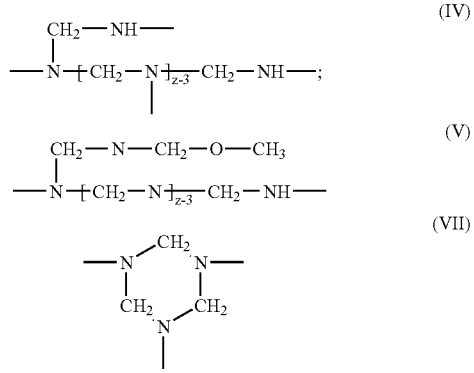

as well as to a lesser extent

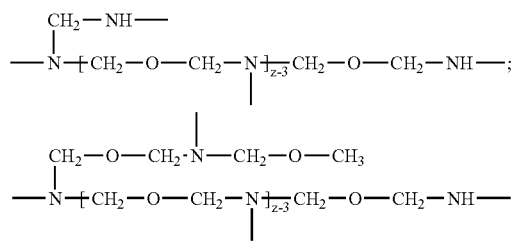

were identified by NMR-spectroscopy.

EXAMPLE 3

In an upstream reaction stage, for the production of of the precondensate, 4.8 kg paraformaldehyde, 0.35 kg trimethylacetaldehyde and 2.2 kg water were dosed into a 20-L stirred tank reactor that contains 2.4 kg methanol, adjusted to a pH of 8.2 by addition of 0.1 n methanolic KOH, and stirred for 40 min at 35° C. To the suspension, 4.4 kg melamine and 0.9 kg benzoguanamine are added, heated for 20 min to 70° C., and stirred for an additional 15 min while raising the temperature to 75° C. After cooling to 55° C., the alkaline solution is continuously fed into a stream tube filled with an ion exchanger, neutralized, and transferred into a 40-L stirred tank reactor.

In the first process stage, for the etherification, an additional 13 kg of methanol is added to the precondensate produced in the upstream reaction stage, heated to 57° C., the reaction batch adjusted to a pH of 4.9 with concentrated hydrochloric acid, and stirred an additional hour at this temperature.

In a second step of the first process stage, the partially etherified precondensate is adjusted with 20% methanolic KOH to a pH of 10.0, and methanol and water distilled off at 80° C./50 mbar. The reaction batch is dissolved with addition of 11 kg methanol, adjusted with concentrated hydrochloric acid to a pH of 4.3, and etherified for 1 hour at 55° C. After adjustment to a pH of 9.7 with 20% methanolic KOH, the reaction batch is concentrated down at 80° C./10 mbar.

For purification, the melt is dissolved in 6.5 kg isobutanol in the second process stage and the precipitated salts separated out in a pressure filter. The solution of the etherified precondensate is transferred to a laboratory film evaporator with a discharge screw and isobutanol distilled off to a residual proportion of 10%.

In the third process stage for condensation of the aminotriazine ethers to oligotriazine ethers, the melt is temperature controlled 15 min at 110° C. and the concentrated liquid resin is dosed by means of a dosing pump at a rate of 2.2 kg/hr into a Leistritz twin screw extruder of the type Micro 27-44 D with counter-rotating screws and three degassing zones. The liquid resin in the extruder is first degassed at a material temperature of 140° C./50 mbar and then recondensed with dosing in of a mixture of 50% ethylene-butylacrylate-hydroxyethyl acrylate-copolymer (molar ratio 3:2:1), 48% glass fibers, 1% ammon chloride and 1% bis-2,2,6,6-tetramethyl-4-piperidyl-sebacate at 1.4 kg/hour at a material temperature of 195° C. under vacuum. After a residence time in the extruder of 6.5 min, the oligotriazine ether is fed by a melt gear pump (type extrex SP, Maag pump systems) into a pelletizer and formed into pellets.

The resulting pellets of oligotriazine ether compounds are processed in an injection molding machine at a material temperature of 230° C. into standard test specimens. The mechanical testing yields a flexural modulus of 3600 MPa and a notch impact strength of 12 kJ/m$^2$.

EXAMPLE 4

In a 30-L stirred tank reactor with a bottom discharge valve, a mixture of 10.8 kg butanol, 4 kg 30% formalin solution, 1.5 g equivalents of an ion exchanger on the basis of chlormethylated styrene divinylbenzene copolymers aminated with trimethylolamine (content of divinylbenzene 12 wt %, average particle size 0.55 mm), and 2.1 g equivalents of an ion exchangers on the basis of sulfonated styrene-divinylbenzene copolymers (content of divinylbenzene 9 wt %, average particle size 0.65 mm) is heated to 95° C. while stirring, and, then, a mixture of 1.51 kg melamine and 0.55 kg butyroguanamine is added via a dosing belt weigher over a period of 20 min into the reactor. After an additional 60 min of stirring at 95° C., the stirrer is removed, with phase separation into a lower aqueous layer that contains the ion exchanger and an upper layer with the butanolic solution of the aminotriazine ether mixture occurring.

After discharge of the lower layer with the ion exchangers, the butanolic solution is transferred to a laboratory type film evaporator with a discharge screw and butanol distilled off to a residual proportion of 9%.

For condensation of the aminotriazine ether mixture to oligotriazine ethers, the melt is temperature controlled for 20 min at 110° C. and the concentrated liquid resin dosed by means of a dosing pump into a Leistritz twin screw extruder of the type Micro 27-44 D with counter-rotating screws and three degassing zones. The liquid resin is first degassed in the extruder at a material temperature of 145° C./30 mbar and then recondensed at a material temperature of 195° C. under vacuum. After a residence time in the extruder of 7 min, the oligotriazine ether is fed by a melt gear pump (type extrex SP, Maag pump systems) into a self-cleaning melt filter and, for forming, is shaped into pellets in a pelletizer with a cooling conveyor.

The resulting pellets of the oligotriazine ethers mixture are fully soluble in dimethyl sulfoxide. GPC analyses yield a weight-average molecular weight of 3050. NMR analyses indicated that the oligotriazine ether mixture consists of 91 wt % linear aminotriazine ethers and 9 wt % chain-branched aminotriazine ethers. The bridging bonds between the triazine rings with linear linking form predominantly —NH—CH$_2$—NH— units; in addition, —N(CH$_2$—OC$_4$H$_9$)—CH$_2$—NH— units are present to a very small extent as bridging bonds.

Bridging bonds of the type

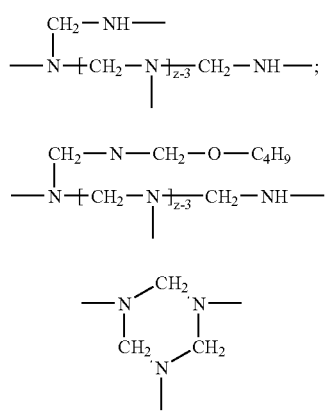

were identified by NMR-spectroscopy as bridging bonds with chain branching.

Bridging bonds of the structure

—NH—CH$_2$—O—CH$_2$—NH—; —N(CH$_2$—OC$_4$H$_9$)—CH$_2$—O—CH$_2$—NH— as well as

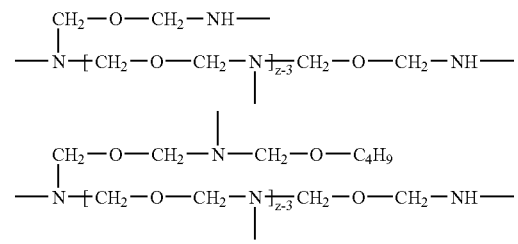

fell within the range of the limit of detection.

EXAMPLE 5

Production of Composite Plastics 5.1 Production of the Molding Material from Oligotriazine Ethers In a first process stage, 4.8 kg of a powdered melamine formaldehyde precondensate (Lamelite 200, Agrolinz Melamin) is disseminated via a dosing belt weigher into a 50-L stirred tank reactor, in which 12 kg of methanol and 320 mL of concentrated hydrochloric acid were placed in advance, at 32° C. with stirring for a period of 2 hours. After complete dissolving of the precondensate, stirring continues for one additional hour at 35° C., the reaction batch is adjusted with 20% methanolic KOH to a pH of 9.5, and the methanol water mixture is distilled off at 50 to 80° C./15 mbar. 27 L butanol is added to the residue, the pH is adjusted with hydrochloric acid to pH 5, and the reaction mixture is gradually heated from 95 to 115° C., until the liberated methanol is distilled off.

After cooling to 80° C. in the second process stage for purification of the etherified precondensate, the etherified and partially transetherified precondensate produced in the first process stage is adjusted with 20% methanolic KOH to a pH of 10.2 and the precipitated salts separated out in a pressure filter. The butanolic solution of the partially etherified precondensate is transferred to a laboratory film evaporator with a discharge screw and butanol distilled off to a residual proportion of 14%.

In the third process stage for condensation of the aminotriazine ethers to oligotriazine ethers, the melt is temperature controlled 30 min at 90° C. and the concentrated liquid resin is dosed by means of a dosing pump into a Leistritz twin screw extruder of the type Micro 27-44 D with counter-rotating screws and three degassing zones. The liquid resin is first degassed in the extruder at a material temperature of 140° C./100 mbar and then recondensed at a material temperature of 185° C. under vacuum. After a residence time in the extruder of 6 min, the oligotriazine ether is fed by a melt gear pump (type extrex SP, Maag pump systems) into a self-cleaning melt filter and, for forming, is shaped into pellets in a pelletizer with a cooling conveyor.

5.2 Prepreg-Production 80 wt % MF-resin pellets are melted together with 20 wt % polyethylene glycol (molar mass 1000) at 110° C., intensively mixed and placed in a 110° C. hot constant temperature vat. Cellulose fiber mats (Lyocellfasem, Lenzing AG) are immersed in the melt. After these are completely wetted within 10 min, the mats are removed from the melt through a stripper to remove excess resin. Then, the wetted mats are placed in a cold air current to solidify. The prepregs thus produced have a resin coating of 35 wt % based on the total prepreg weight.

5.3 Production of 3° D.-Profile-Laminates

The prepregs are cut to a size of 30×20 cm. For the production of a molded part with curved edges as a U-profile, 3 prepregs are placed one on top of the other in a compression mold (30×20 cm) preheated to 80° C. and and the mold slowly closed, with the prepregs able to be slightly shaped because of the not yet hardened resin. Under a pressure of 150 bar, the temperature is raised to 180° C., pressing continues for 15 min, and mold is cooled back down to 70° C. The finished workpiece is removed and the burr resulting from escaping resin on the edge of the compression mold ground off.

Test specimens cut from the workpiece have a tensile strength of 45 MPa, a notch impact strength of 0.3 J/cm$^2$ and a linear shrinkage of 0.012 cm/cm.

EXAMPLE 6

Production of Amine Resin-Fiberglass Composite 6.1 Production of the Molding Material of Oligotriazine Ethers In an upstream reaction stage for the production of the precondensate, 5.16 kg paraformaldehyde and 2.4 kg water are dosed into a 50-L stirred tank reactor that contains 2.4 kg methanol, adjusted to a pH of 8.2 by addition of 0.1 n methanolic KOH, and stirred 30 min at 50° C. To the suspension, 4.4 kg melamine and 0.7 kg acetoguanamine are added, heated for 10 min to 71° C., and stirred for an additional 10 min while raising the temperature to 75° C.

After cooling to 57° C., in the first process stage for the etherification of the precondensate produced in the upstream reaction stage, an additional 12 kg of methanol is added, the reaction batch adjusted with concentrated hydrochloric acid to a pH of 4.7, and stirred an additional 45 min at this temperature.

In a second step of the first process stage, the partially etherified precondensate is adjusted with 20% methanolic KOH to a pH of 10.2, and methanol and water distilled off at 80° C./50 mbar. The reaction batch is dissolved with addition of 12 kg methanol, adjusted with concentrated hydrochloric acid to a pH of 4.5, and etherified for 1 hour at 55° C. After adjustment to a pH of 9.5 with 20% methanolic KOH, the reaction batch is concentrated down at 80° C./10 mbar.

For purification, the melt is dissolved in 6 kg butanol in the second process stage and the precipitated salts separated out in a pressure filter. The butanolic solution of the etherified precondensate is transferred to a laboratory film evaporator with a discharge screw and butanol distilled off to a residual proportion of 12%.

In the third process stage for condensation of the aminotriazine ethers to oligotriazine ethers, the melt is temperature controlled 20 min at 100° C. and the concentrated liquid resin is dosed by means of a dosing pump into a Leistritz twin screw extruder of the type Micro 27-44 D with counter-rotating screws and three degassing zones. The liquid resin is first degassed in the extruder at a material temperature of 140° C./100 mbar and then recondensed at a material temperature of 190° C. The resultant low-molecular condensation products are removed under vacuum. The recondensed resin is discharged directly into a scond extruder (cascade principle) and cooled to 120° C. By side dosing, 5 wt % of zeolite (molecular sieve 5A, UOP GmbH) and 8 wt % Na-montmorillonite (Südchemie AG), based in each case on the recondensed resin, are added. Then, the resin is fed by a melt gear pump (type extrex SP, Maag pump systems) into a self-cleaning melt filter and for forming is shaped into pellets in a pelletizer with a cooling conveyor.

6.2 Production of the Amine Resin-Fiberglass Composite

For the production of continuous glass strand reinforced amine resin sheets, the pellets are melted in an extruder and pressed via a slot die into a fiberglass mat (105 g/m$^2$). This is fed along with two other fiberglass mats pretreated in this manner via a heating chamber at 100° C. into a double band press and molded at 180° C. and a pressure of 30 bar. The finished composite is prepared and standard test specimens cut.

The mechanical testing yielded a tensile strength of 80 MPa, a notch impact strength of 0.4 j/cm$^2$ as well as water absorption 0.5% and a linear shrinkage of 0.001 cm/cm.

EXAMPLE 7

Production of Tubes

Into a Leistritz twin screw extruder ZSK 27, L/D=44 with parallel screws, dosing equipment for fiber materials in the fourth cylinder and a decompression zone for vacuum degassing, temperature profile 20/120/120/120/120/120/120/120/140/160° C., are dosed into the feed zone with 9 kg/h MF-resin pellets according to Example 1, with 4.5 kg/h granulate of ethylene-vinyl acetate-copolymer (melt flow index 18 g/10 min at 190° C./2.19 kp, vinyl acetate content 17 wt %), with 0.75 kg/h zeolite (molecular sieve 5A,UOP GmbH) and with 0.75 kg/h fluorinated phyllosilicate (Somasif ME 100, Uni-Coop, Japan). After mixing and homogenization of the components, cellulose fibers are added in the fourth cylinder in the form of a card sliver, being directly unwound from a spool, and fed by the extruder itself. After reducing the size of the fibers, intensive homogenization and condensation, the mixture is discharged into a screen mandrel pipe die that is heated in multiple stages dielectrically to a temperature gradient of 160–195° C. as a round hollow profile.

The tube is characterized by a smooth surface and contains, in addition to the silicates, cellulose fibers of varying lengths.

If the mixture is discharged through a profile die 10×4 mm instead of through a screen mandrel, standard test specimens produced from the profile have a tensile strength of 42 MPa and a notch impact strength of 0.47 J/cm$^2$.

EXAMPLE 8

Production of Injection Molded Parts 8.1 Production of the Molding Material

Into a Leistritz twin screw extruder ZSK 27, L/D=44, with parallel screws, side stream dosing arrangement for powdered media in the fourth cylinder, and a decompression zone for vacuum degassing, temperature profile 20/120/120/120/120/120/120/120/120/100° C., are dosed into the feed zone at 7.5 kg/h MF-resin pellets according to Example 1, at 1.5 kg/h macerated fiber glass (aminosilane sizing, fiber cross-section 17 μm, fiber length 3 mm) and at 1.0 kg/h commercial nitrile rubber. Via the side stream dosing arrangement in the fourth cylinder, a mixture of 40 wt % zeolite (molecular sieve 13x, UOP GmbH) and 60 wt %

Na-montmorillonite (Südchemie AG, Deutschland) is added at 1.0 kg/h. After intensive homogenization, the mixture is discharged and granulated.

8.2 Production of Moldings Using Injection Molding Technology

The granulate is processed into laminate panels using an injection molding machine. A temperature of 110° C. is set in the delivery section. The temperature in the injection molding chamber is ca. 150° C., and the injection pressure is set at about 100 N/cm$^2$, which drops slightly during the curing process. After a residence time of 5 min, the workpiece is hardened and can be removed after cooling.

The resultant laminate panels have the usual scratch-resistance properties of a melamine formaldehyde resin and are water vapor and chemical resistant. Notched specimen bars have a tensile strength of 62 MPa, a notch impact strength of 0.63 J/cm$^2$ and an elongation at break of 4.1%.

EXAMPLE 9

Production of Fiber-Filled Extruded Bars

Into a Leistritz twin screw extruder ZSK 27, L/D=44 with parallel screws, side stream dosing arrangement for powdered media in the fourth cylinder, and a decompression zone for vacuum degassing, temperature profile 20/120/120/120/120/120/120/120/140/160° C., into the feed zone are dosed at 6.7 kg/h MF resin pellets according to Example 1, at 0.7 kg/h a maleic acid anydride isobutene-α-methystyrene-terpolymer modified with polyethylene oxide monoethylether (molar mass 2500) (molar ratio 2:1:1.5; weight-average molecular weight terpolymer about 17200, reaction level anhydride groups in the terpolymer 60 Mol %), at 1.3 kg/h short cellulose fibers (3 mm) and at 1.3 kg/h short polyamide fibers (3 mm). Via the side stream dosing arrangement in the fourth cylinder, a mixture of 20 wt % of Köstrosorb 1008 (Chemiewerk Bad Köstritz, Deutschland) and 80 wt % of an organically modified Na-montmorillonite with an amine diol (Simulsol ADM 27, Seppic S. A., Paris, Frankreich) used as hydrochloride is added at a rate of 1 kg/h. After intensive homogenization and condensation, the mixture is molded in a profile die into a full profile and packaged after hardening.

Appropriate standard test specimens yielded a tensile strength of 46 MPa, an elongation at break of 3.7% and a notch impact strength of 0.73 J/cm$^2$.

EXAMPLE 10

Production of MF-Foamed Material 1000 g MF-resin pellets according to Example 1 are dissolved in 800 g methanol water mixture (volume ratio 1:1). Added to the resin solution, with intensive mixing by Ultraturrax were 30 g of a nonionic surfactant (copolymer ethylene oxide/propylene oxide, molar ratio 1:1), 300 g pentane as foaming agent, 10 g ammon chloride as 20% aqueous solution as well as 100 g of a 50% aqueous solution of a vinyl acetate hydroxyethyl acrylate copolymer (molar ratio 2:1) with cooling.

The dispersion is fed by a gear pump into a static mixer, while being heated under high pressure to 180° C. The dispersion is relieved via a slot die. Through the pressure relief, the vaporized solvents foam the resin mixture and the complete hardening of the resin takes place through further heating (dielectric) to 200° C.

The foam is then packaged and has a density of about 30 kg/m$^3$.

EXAMPLE 11

Production of Continuous Fibers

The resin granulate according Example 1 is melted in a lab extruder and heated to 120° C.

The melt is supplied at a constant temperature to the feed opening of a spinning pump. With the spinning pump, the preliminary pressure necessary for flowing through a melt filter and a 6-hole spinning die is built up. The resin melt is withdrawn at a drawing speed of 1300 m/min in a drawing shaft with a current of heated nitrogen at a thread diameter of 8–10 μm and cooled.

After solidification of the resin, the fibers are completely hardened in a second section of the drawing shaft in an acidic atmosphere (dry HCl) and finished in the conventional manner.

The invention claimed is:

1. Products, in particular, molding materials of polymers containing triazine segments, the polymers comprising mixtures of meltable oligotriazine ethers containing from 70 to 90 wt % oligotriazine ethers in linear linkage, wherein the triazine segments in the oligotriazine ethers comprise:

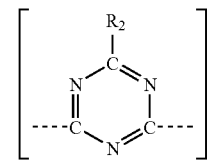

where R$_2$ is selected from the group consisting of —NH$_2$, —NH—CHR$_3$—OR$_4$, —N[CHR$_3$—O—R$_4$]$_2$, —CH$_3$, —C$_3$H$_7$, —C$_6$H$_5$, —OH, phthalimido-, and succinimido-;

R$_3$ is selected from the group consisting of H and C$_1$–C$_7$-Alkyl;

R$_4$ is selected from the group consisting of C$_1$–C$_{18}$-alkyl and H; and the triazine segments are linked by bridging bonds to 4- to 18-ring oligotriazine ethers with linear or branched structure.

2. Products according to claim 1, wherein the bridging bonds comprise linear structures selected from the group consisting of

(I)

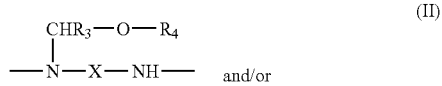

(II)

and/or

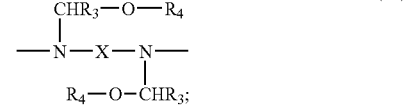

(III)

and where X is selected from the group consisting of CHR$_3$ and CHR$_3$—O—CHR$_3$.

3. Products according to claim 1 or 2, wherein the bridging bonds with branched structure such that z>v+2;

where z=number of bonded triazine rings; and v=number of branching points, are both bridging bonds of type I to III in the linear chain segments segments, and bridging bonds in the highly branched chain segments such that z=v+2, are selected from the group consisting of:

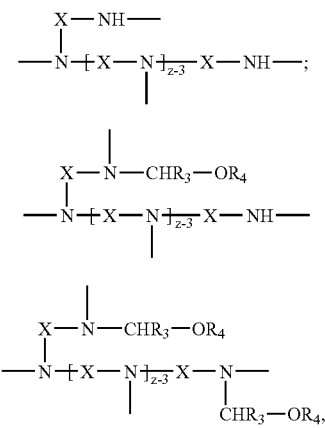

where X is $CHR_3$ or $CHR_3$—O—$CHR_3$; and

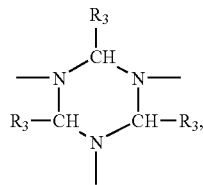

where $R_3$ is H or $C_1$–$C_7$-Alkyl; and
$R_4$ is $C_1$–$C_{18}$-Alkyl; or H.

4. Products according to claim 1, wherein $R_4$ is predominantly $C_1$–$C_{18}$-alkyl.

5. Products according to claim 1, wherein in the oligotriazine ethers, the molar ratio of ether groups/triazine segments is from 1:2 to 4.5:1.

6. Products according to claim 1, wherein the bridging bonds of the form where X is $CHR_3$—O—$CHR_3$ comprise up to 35 wt % in the molding materials of polymers containing triazine segments.

7. Products according to claim 1, wherein the products contain up to 75 wt % of materials selected from the group consisting of fillers, adsorbing materials and reinforcing fibers, up to 50 wt % other reactive polymers of the type selected from the group consisting of ethylene copolymers, maleic acid anhydride copolymers, modified maleic acid anhydride copolymers, poly(meth)acrylates, polyamides, polyesters and polyurethanes, up to 2 wt % of materials selected from the group consisting of stabilizers, UV absorbers and auxiliary agents.

8. Products according to claim 1, wherein the oligotriazine ethers are soluble in polar solvents selected from the group consisting of $C_1$–$C_{10}$ alcohols, dimethyl formamide and dimethyl sulfoxide.

9. Products produced by thermoplastic processing of molding materials from mixtures of meltable 4- to 18-ring oligotriazine ethers based on the structure according to claim 1.

10. Products according to claim 1, wherein the oligotriazine ethers are 4 to 8 ring oligotriazine ethers.

11. Products according to claim 1, wherein the oligotriazine ethers in the mixtures are oligotriazine ethers wherein $R_3$ is H.

12. Products according to claim 1, further comprising partially or completely esterified, amidated, or imidated maleic acid anhydride copolymers.

13. Products according to claim 1, wherein the products are semifinished products selected from the group consisting of sheets, tubes, profiles, coatings, foamed materials, fibers, laminates made with, the resin infusion method, molding materials, injection molded parts, components produced with the resin infusion or resin injection method, and components produced from fibers with filament winding, braiding or pultrusion technology and subsequent resin impregnation.

14. Products according to claim 1, wherein the 4 to 18-ring oligotriazine ethers consist of mixtures of oligotriazine ethers, where $R_2$ is selected from the group consisting of —$NH_2$, NH—$CH_2$—$OR_4$ and —N[$CH_2$—O—$R_4$]$_2$; and $R_4$ is selected from the group consisting of $C_1$–$C_{18}$-alkyl and H.

15. Products according to claim 1, wherein the mixtures of oligotriazine ethers contain 70 to 90 wt % oligotriazine ethers in which the triazine segments are linked by —NH—$CHR_3$—NH— groups.

16. Products according to claim 1, further comprising partially or completely esterified or amidated maleic acid anhydride copolymers.

17. Products according to claim 1, further comprising fillers or adsorbing materials selected from the group consisting of $Al_2O_3Al(OH)_3$, $SiO_2$, barium sulfate, calcium carbonate, glass beads, silica, mica, silica flour, powdered slate, microballoons, carbon black, talc, phyllosilicates, molecular sieves, powdered stone, wood flour, cellulose, cellulose derivatives, and combinations thereof.

18. Products according to claim 1, further comprising reinforcing fibers selected from the group consisting of glass fibers, carbon fibers, cellulose fibers, flax, jute, kenaf, wood fibers, polyacrylonitrile, polyvinyl alcohol, polyvinyl acetate, polypropylene, polyesters, polyamides and combinations thereof.

19. Products according to claim 1 provided in a form selected from: foam sheets as insulation components; of sheets as trim, elements; tubes and hollow profiles for ventilation technology; injection molded fibers for electrical insulating papers, fireproof clothing, apparel for high working temperatures, fireproof roofs, filter mats, felts for paper machines, and motor vehicle and machine insulation covers; fiber reinforced plastic components; sandwich components; and containers or profiles.

20. Products according to claim 1 comprising hot-melt adhesives, sheets, tubes, profiles, injection molded parts, fibers, coatings, foamed materials, impregnation resins, paint resins, laminating resins, foams, and microcapsules.

* * * * *

UNITED STATES PATENT AND TRADEMARK OFFICE
CERTIFICATE OF CORRECTION

PATENT NO. : 7,173,104 B2 Page 1 of 1
APPLICATION NO. : 10/495903
DATED : February 6, 2007
INVENTOR(S) : Manfred Ratzsch et al.

It is certified that error appears in the above-identified patent and that said Letters Patent is hereby corrected as shown below:

Column 26, line 56, claim 2        Delete "and/or",
                                   Insert --and--

Column 28, line 16, claim 13       Delete ","

Column 28, line 50, claim 19       Delete "of"

Column 28, line 51, claim 19       Delete ","

Signed and Sealed this

Seventeenth Day of June, 2008

JON W. DUDAS
*Director of the United States Patent and Trademark Office*